UNITED STATES PATENT OFFICE.

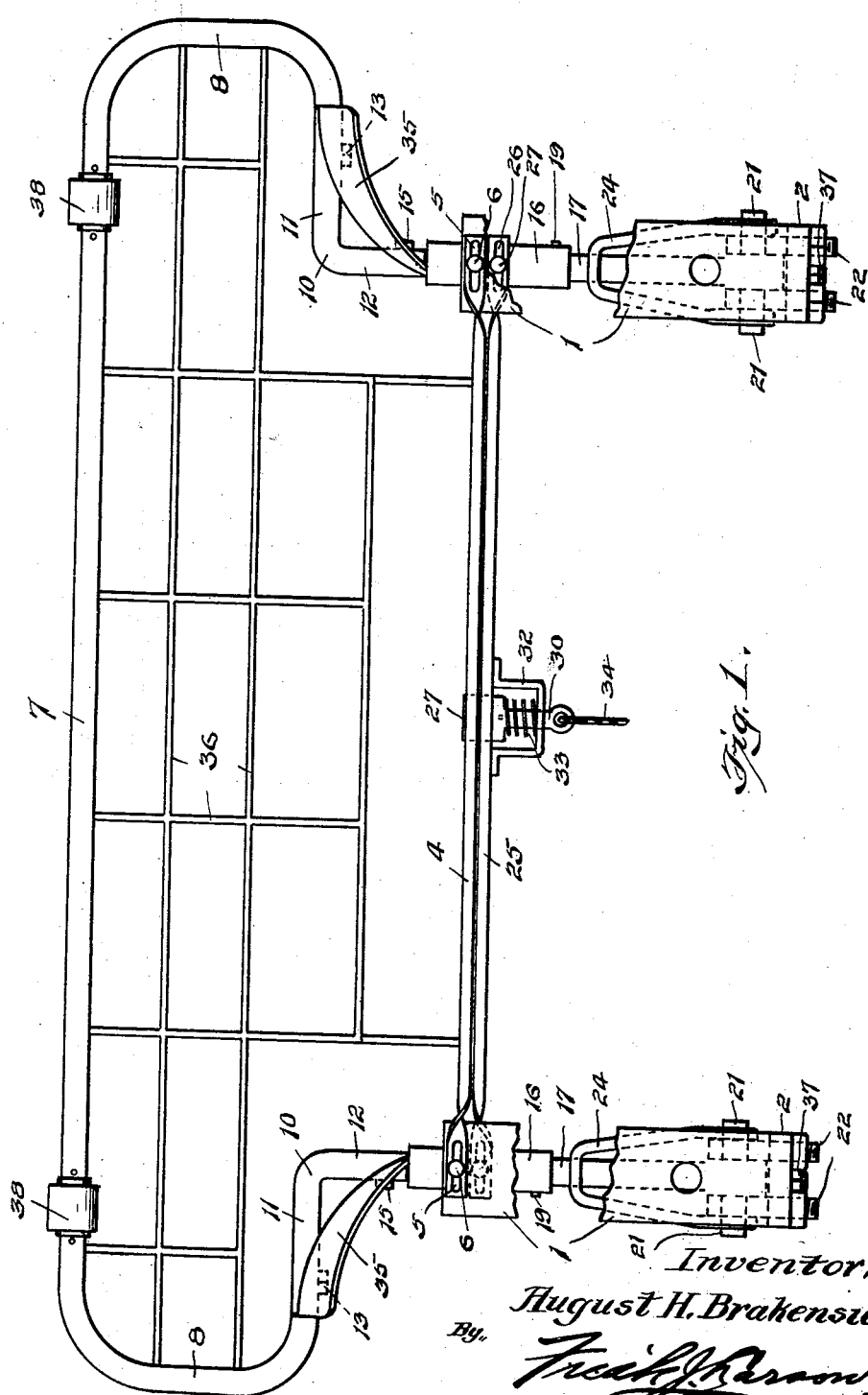

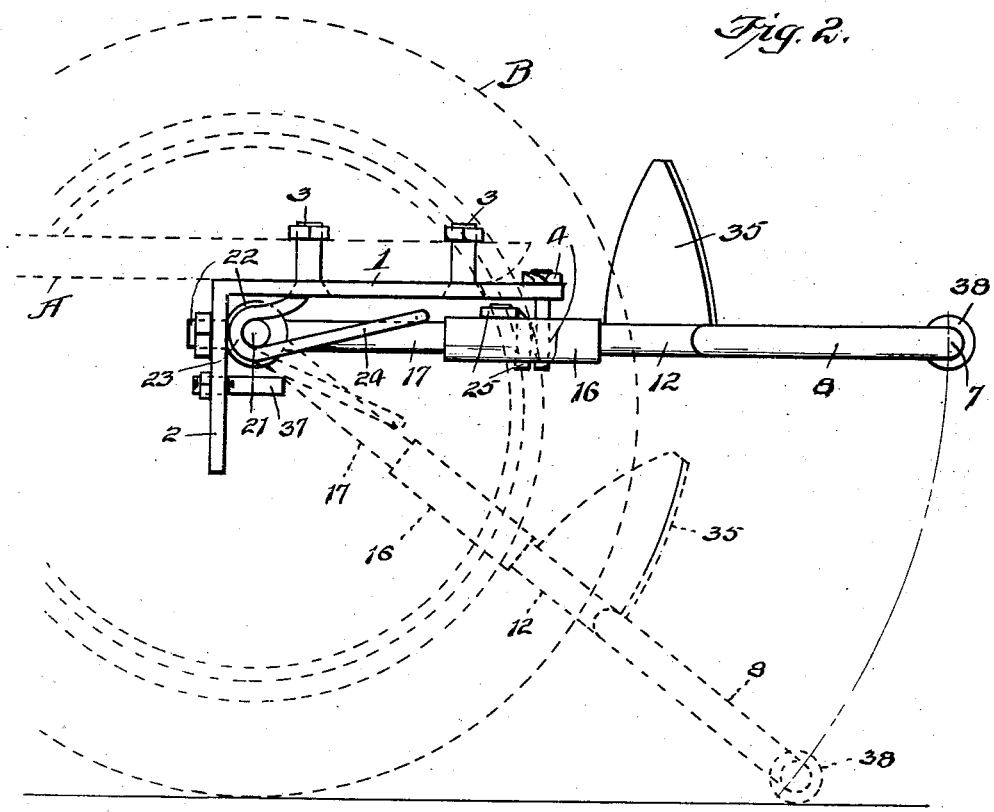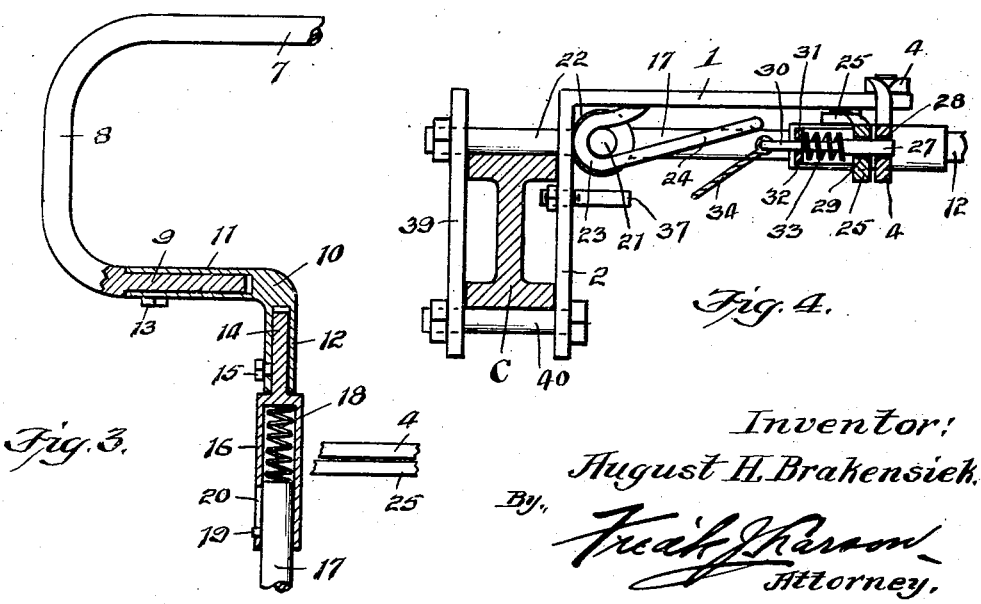

AUGUST H. BRAKENSIEK, OF ST. LOUIS, MISSOURI.

AUTOMOBILE-FENDER.

1,265,878.   Specification of Letters Patent.   Patented May 14, 1918.

Application filed January 8, 1917. Serial No. 141,151.

*To all whom it may concern:*

Be it known that I, AUGUST H. BRAKENSIEK, a citizen of the United States, residing in the city of St. Louis and State of Missouri, have invented a certain new and useful Automobile-Fender, of which the following is a specification.

My invention relates to improvements in automobile fenders in which a movable fender operates in conjunction with a stationary supporting means.

The objects of my invention are, first, to provide a fender which by coming in contact with any object or person will drop from its normal horizontal position to an inclined position to prevent the object from getting under the wheels of the vehicle while still in motion; second, to afford facilities for the proper adjustment and workings of the various parts so that the fender will readily and quickly drop to an inclined position, no matter where the impact comes upon the fender; third, to provide locking means to normally hold the fender in its horizontal position; fourth, to provide means to operate the locking means from the seat for tripping the fender when desired; and, fifth, to provide means for attaching the supporting means of the fender, either to the chassis, sills, springs, or the front axle of a vehicle.

With the above and other objects in view, the invention consists in certain new and novel features of construction, combination and arrangement of parts, as will be more fully described hereinafter, and finally pointed out in the claims hereto appended.

Referring to the accompanying drawings forming a part of this specification wherein like characters of reference denote similar parts throughout the several views:

Figure 1, is a plan view of the movable fender, the supporting parts being partly broken away.

Fig. 2, is a side elevation of my fender applied to the chassis frame or sill, showing the fender in its normal horizontal position in full lines, and in an inclined position in dotted lines.

Fig. 3, is a detail of the adjustable parts of the fender.

Fig. 4, is a detail showing the device as applied to the front axle of a vehicle.

Referring to the drawings, the reference character A designates one of the sills of a chassis; B, one of the front wheels; and C, designates the front axle of a vehicle, such for instance, as a Ford.

In carrying out the aim of my invention, I employ a pair of arms 1 each having a depending arm 2. Each arm 1 is suitably secured or fixed to one of the side chassis-sills A through suitable fastening means 3. The forward end of each of the arms 1 are connected by means of a cross-bar 4. The arms 1 are each adjustable with relation to the cross-bar 4 due to the slotted openings 5 in each end of the cross-bar 4, through which openings is adapted to pass the fastening devices 6 for locking the parts together after having been properly adjusted to fit the chassis-sills A.

The fender proper consists of the following instrumentalities, to-wit:

The front bar of the fender is designated 7. This may be flat, round, or of any other design. The bar 7 terminates in the rearwardly extending end pieces 8, which end pieces finally terminate in inwardly extending shanks 9. An elbow 10, having the hollow arms 11 and 12, is mounted upon each of said shanks 9. The hollow arm 11 of each elbow 10 is adapted to be carried by the shanks 9. A set screw 13 is employed to lock the shanks and hollow arms 11 in their adjusted positions, as is manifest.

A shank 14 is adapted to be slidably mounted within each hollow arm 12 of the elbows 10, and a set screw 15 is employed to lock the parts after they have been properly adjusted. It will be observed that this arrangement of parts permits the fender to be lengthened or shortened, widened or made narrower, as the case may demand in applying the fender to various makes of chassis or of vehicles.

Integral with each shank 14 is a tubular member 16. The free end of a hinge-arm 17 is adapted to be slidably mounted within each tubular member 16. A coiled-spring 18 is carried within each tubular member 16 and acts against the free end of each hinge-arm 17, as clearly shown in Fig. 3, thereby permitting rearward movement of the fender proper when coming into contact with any object from any angle. Each hinge-arm 17 is provided with a guide-pin 19 adapted to pass through and work in a small slotted opening 20 in the wall of each tubular member 16. These pins 19 and slotted openings 20 permit the rearward movement of the fender proper for tripping same and allowing the fender to drop to an inclined position when coming in contact with an object.

The opposite end of each hinge-arm 17 is provided with the side trunnions 21. These trunnions 21 are each adapted to pass through the head of an eyebolt 22, which eyebolts are in turn fixed to the ends 2 of the arms 1.

A suitable spring member 23 is mounted upon the trunnions 21 and each has its long end 24 in engagement with the hinge-arms 17, as clearly shown in Figs. 2 and 4, for the purpose of adding quickness to the dropping movement of the fender proper when falling from its horizontal or normal position.

A suitable cross-bar 25 is mounted at each end upon the two tubular members 16. Each end of this cross-bar 25 is provided with a slotted opening 26 through which is adapted to pass a fastening device 27 for locking the bar against movement after it has been adjusted upon the tubular members 16.

The locking means for normally holding the fender proper in its horizontal position, until tripped, from any cause, will now be described:

The locking device consists of a plunger-head 27 adapted to pass through the openings 28 and 29 in cross-bars 4 and 25. The plunger-head 27 is provided with a rearwardly extending arm 30 which is adapted to pass through an opening 31 in a U-shaped supporting member 32. A coiled-spring 33 is mounted between the head 27 and the U-shaped member 32 to normally hold the plunger-head in its foremost position, as is manifest. A suitable cable 34 is connected to the arm 30 of the plunger and may run to a suitable lever near the seat of the vehicle (not shown) so that the plunger may be retracted manually, if desired, for tripping the fender and causing it to drop without the fender coming in contact with any object.

It will be readily observed from the foregoing description that the fender may be tripped and allowed to drop to an incline either by the fender bar 7 coming in contact with an object or by pulling on the cable 34.

When the fender is tripped due to the fender-bar 7 coming in contact with some object, it will be observed that the tubular-members 16 are caused to slide or telescope upon the free ends of the hinge-arm 17 until the cross bar 25 has been retracted sufficient to withdraw the plunger-head 27 from the opening 29 in the stationary cross-bar 4. After the fender has been tripped and fallen, the coiled-springs 17 will force the fender-bar 7 back to its proper and normal position. The fender remains in its dropped or inclined position until it has been raised and again locked in its horizontal or normal position.

A wheel guard 35 is secured to each elbow 10 to prevent a person from being drawn in between the fender and the wheels. A suitable netting or other means 36 may be secured to the fender-frame to prevent objects passing through the fender after it has been tripped and dropped.

A suitable stop 37 may be secured to each supporting arm 2 to limit the downward movement of the hinge-arms and fender proper. By employing these stops the fender may be adjusted so as to prevent the fender-bar 7 from coming in contact with the ground or pavement. A pair of rollers 38 may be mounted upon the fender-bar 7, if desired.

When the supporting arms 1, having the depending arms 2, are attached to the axle of a vehicle, an extra strap 39 is employed and a bolt 40, as clearly shown in Fig. 4.

It will be observed that by employing the elbows 10, or their equivalent, and by slotting the ends of the cross bars 4 and 25, the device may be adjusted to lengthen or shorten the fender, and to also widen or narrow the stationary supporting arms and the hinge-arms to fit any size or width of chassis or axle.

It will be understood that various changes may be made in the minor details within the scope of the appended claims, and I, therefore, do not wish to limit or be limited to the precise details shown and described, but wish it to be clearly understood that any modified constructions are simply modifications of my improved automobile fender, and such modifications as come under the scope of this specification and the appended claims I consider within the spirit of my invention.

What I claim is:

1. In a device of the class described, a stationary frame adapted to be fixed to the chassis of a vehicle, a trip operated fender hingedly connected to said frame, and means for adjusting the fender laterally or longitudinally.

2. In a device of the class described, a stationary frame adapted to be fixed to the chassis of a vehicle, a pair of arms hingedly connected to said frame, resilient means adapted to exert downward pressure upon said arms, an adjustable fender slidably mounted upon said arms, resilient means for normally holding the fender in its extended position, locking means carried by the fender and adapted to engage the stationary frame for normally holding the fender in its horizontal position, and means for actuating said locking means for tripping the fender and permitting it to drop to an inclined position.

3. An automobile fender comprising, in combination, a pair of L-shaped arms adapted to be fixed to the chassis of a vehicle, a cross-bar adjustably secured to and connecting said arms, forwardly extending arms hingedly connected to each L-shaped arm, a resilient depressing means engaging each hinged arm, a tubular member adapted to be slidably mounted upon the free end of each hinged arm, a buffer arranged in each tubular member between the free end of each hinge-arm and the end of each tubular member, a stop to limit the telescopic movement of each tubular member upon each hinge-arm, a shank integral with each tubular member, a fender-bar having a shank at each end arranged at a right angle to each shank integral with said tubular member, an elbow adjustable on each of the aforesaid shanks, a net protection for the fender, a wheel guard carried by each of the aforesaid elbows, a cross-bar connecting said tubular members and adjustable thereon, and a locking mechanism carried by said cross-bar.

In testimony whereof, I have hereunto signed my name to the specification.

AUGUST H. BRAKENSIEK.

Copies of this patent may be obtained for five cents each, by addressing the "Commissioner of Patents, Washington, D. C."